United States Patent Office 3,335,353
Patented Aug. 8, 1967

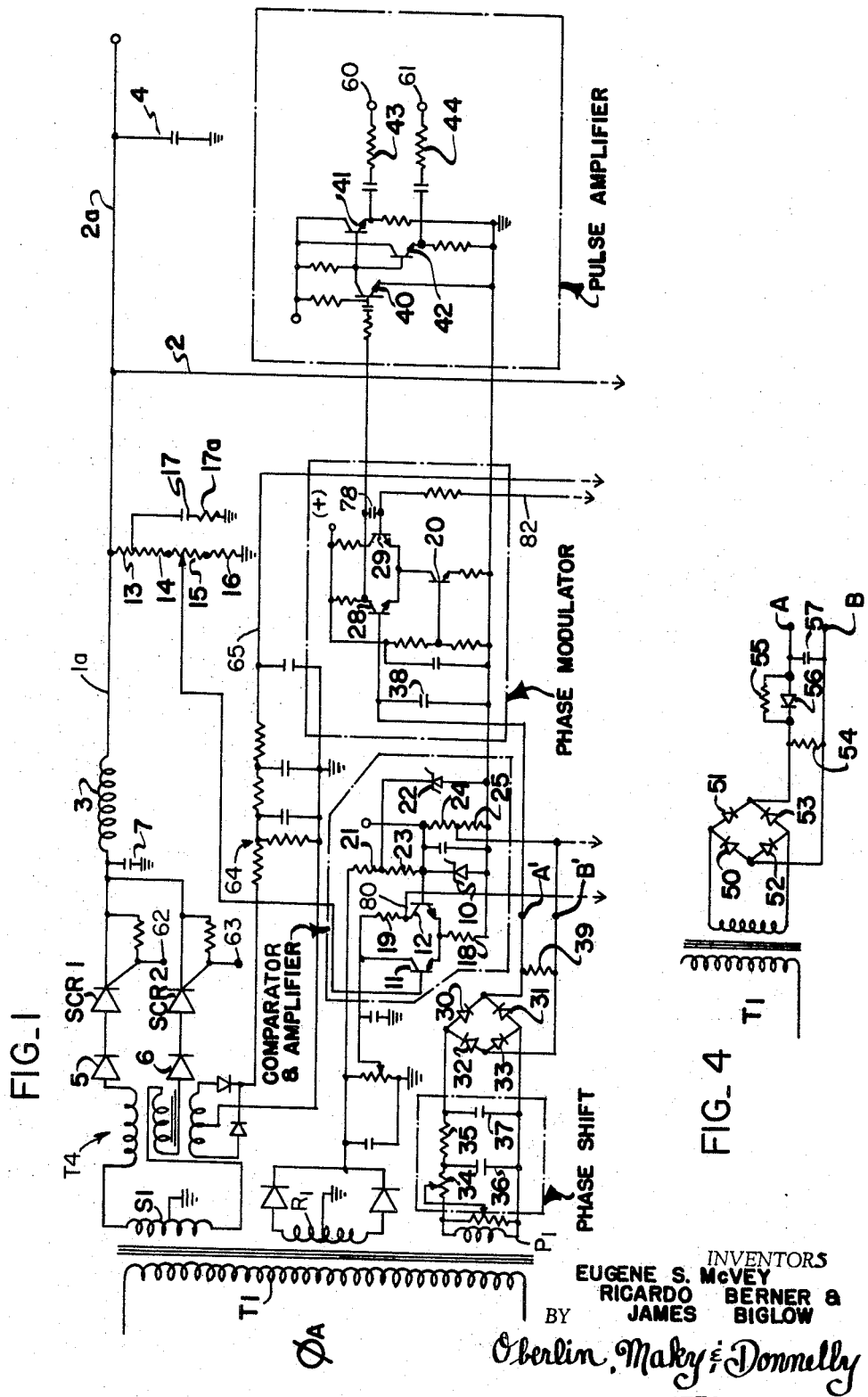

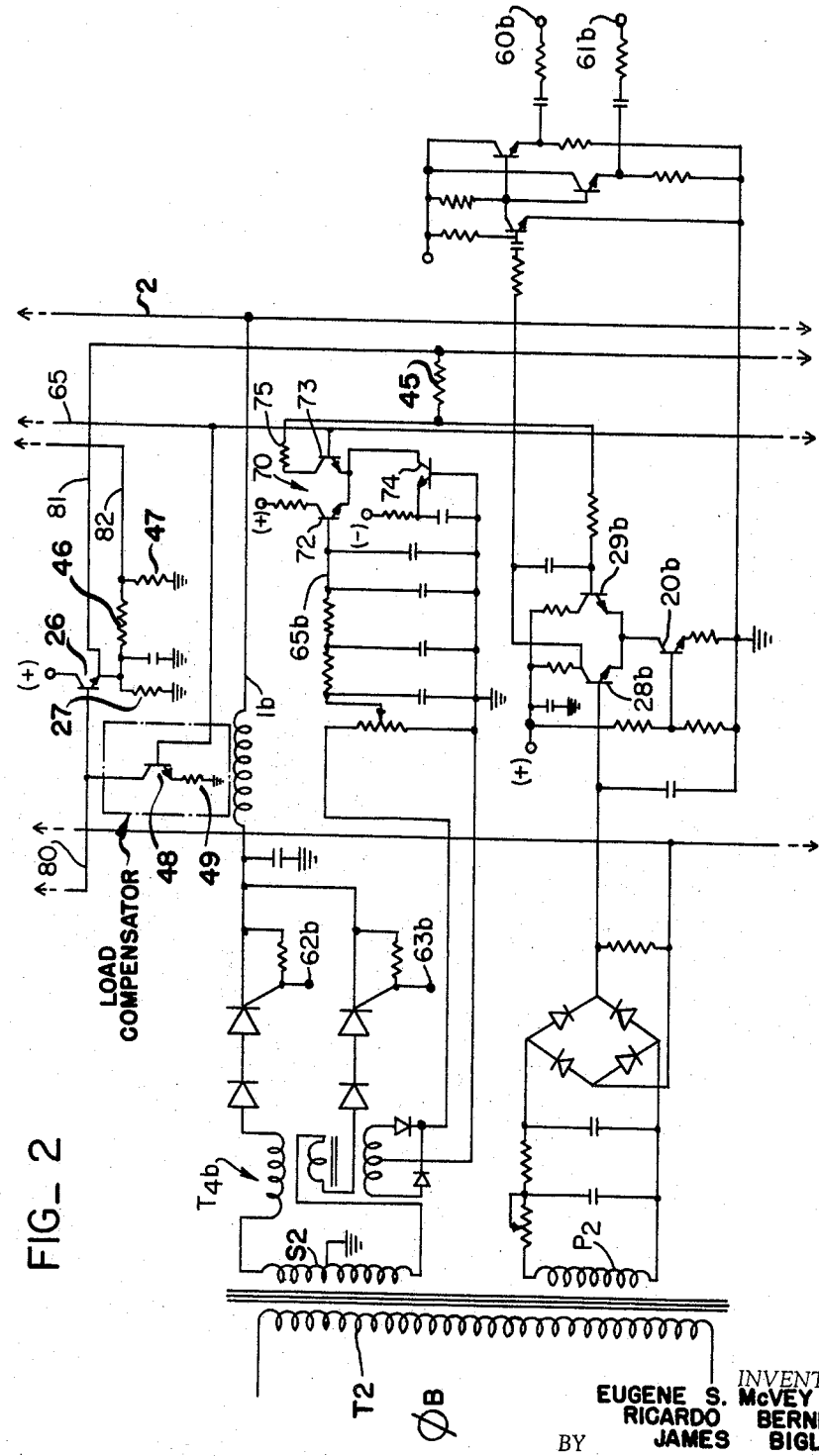

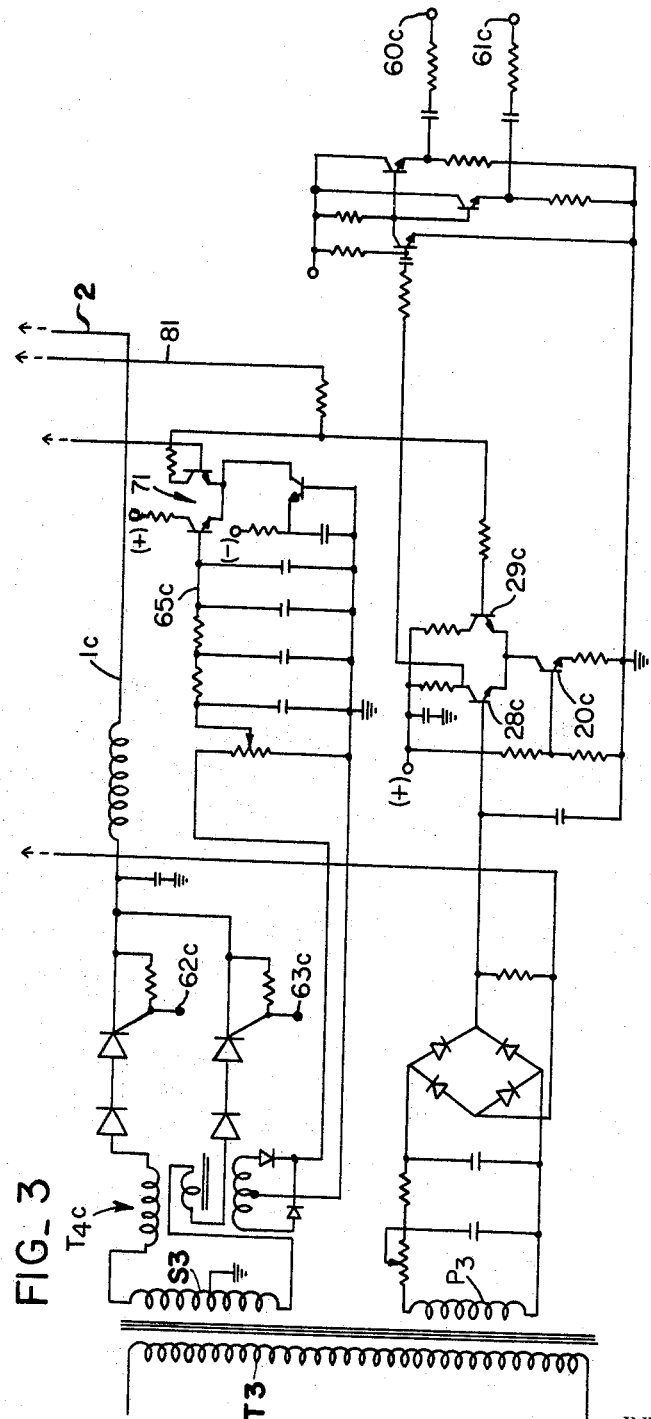

3,335,353
REGULATOR SYSTEM FOR CONVERTING ALTERNATING TO DIRECT CURRENT
Eugene S. McVey, Ricardo Berner, and James W. Biglow, Charlottesville, Va., assignors, by mesne assignments, to Basic Incorporated, Cleveland, Ohio, a corporation of Ohio
Filed May 16, 1963, Ser. No. 280,888
4 Claims. (Cl. 321—5)

The present improvements relating as indicated to electrical regulating systems are more particularly directed to such a system designed to convert or switch alternating current, including multi-phase alternating current, to direct current.

Systems of the type in question are widely used in industry as, for example, in charging batteries and in supplying power for communication systems. Heretofore rotating mechanisms have ordinarily been employed to effect the desired conversion. However, the disadvantages of such mechanism, such as maintenance problems, size, weight and the like, are well known. In other such systems, specially designed magnetic amplifiers have been utilized to control the output level. However, such systems in addition to the magnetic amplifiers require rectifiers to convert the alternating current to direct current. Such magnetic amplifier systems are necessarily heavy and cumbersome. In addiiton, the large time constant associated with the inductance of the control winding makes it difficult to obtain fast response to transient conditions.

One principal object of our present improved system is to provide not only relatively simple and compact means, whereby the desired conversion or switching of current may be readily accomplished, but to regulate the direct current output, either as to voltage or current, even though the input voltage and frequency may vary as well as the load. Another object is to provide means whereby recovery from transient conditions may be obtained with an accuracy of better than one percent. Still a further object is to provide a system wherein, if desired, the output may be a function of the input instead of a fixed value, in which case the system constitutes in effect a large power Servo amplifier.

A more specific object of this invention is to provide a regulated voltage output system for producing DC power from an AC source wherein SCR's are used to provide the rectification, and the firing angle of the SCR's is controlled in a manner dependent upon both internal and environmental conditions of the system.

A still more specific object of the invention is to provide a unique circuit for varying the firing angle of SCR's in accordance with input, output, load and inter circuit conditions of the system.

Still another specific object of this invention is to provide a system which produces a DC output from a single or three phase input wherein rectification is produced by controlled rectifiers and the control is a function of input and output voltage, load variations and current balance within the system.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIGS. 1, 2 and 3 represent inclusively the wiring diagram of a system for converting alternating to direct current wherein our present improvements are incorporated; the dotted lines at the bottom and top of FIGS. 1 and 2 respectively and again at the bottom and top of FIGS. 2 and 3 being continuous in the assembled system. FIG. 4 represents a modification in one component of said system.

A distinguishing feature of our improved system is the use of silicon controlled rectifiers, hereinafter identified by the usual commercial designation SCR, or other switch action components both as the control elements and for converting the AC to DC current. Although it is not necessary and may not always be desirable to use SCR's to convert the alternating to direct current, but only for the purpose of control, the devices in question present a unique advantage over magnetic amplifier systems in that diodes must always be used in the latter. Furthermore, SCR's are many times smaller and lighter than magnetic amplifiers; for example, a magnetic amplifier system weighing a thousand pounds may be reduced as much as fifty percent by utilizing SCR's as in our improved system.

It is considered unnecessary to illustrate or describe in detail the construction of the device herein designated SCR since we are concerned only with the basic operation thereof which is well known. Thus, the device acts as an open circuit, i.e., does not conduct current, until a pulse of current is passed through the gate thereof. Then if the anode is biased positive with respect to the cathode, the SCR switches to a low resistance, ideally a short circuit, and conducts current. The anode to cathode voltage must be either removed or reversed before the SCR will return to a high resistance, non-conducting state. In an AC circuit the voltage reverses and the SCR turns off automatically. Accordingly, regulation may be achieved by varying the angle with respect to the AC input, at which the SCR is turned on while rectification is achieved because the SCR conducts in only one direction.

Having in mind the foregoing operating characteristics of the device in question, several difficulties or problems are presented in utilizing the same in a regulator system of the type here contemplated; particularly in controlling the firing angle of the SCR's, protecting them against overload, and designing the most effective networks to smooth or filter the output therefrom.

Referring now to the drawings, FIGS. 1, 2 and 3, as previously explained, are to be considered together as illustrating an inclusive system, the representation of which is thus divided into three parts for convenience in representing the same on sheets of prescribed size. The system there represented is a three phase system, suitable for use, although not so limited, to the direct current charging of a battery. Furthermore, as will appear, use of our improved regulating means is not limited to such three phase system.

Corresponding with each of the three phases A, B and C are transformers T1, T2 and T3 with associated secondaries S1, S2, S3, P1, P2, P3 and R1. For the most part, the wiring layout appurtenant to each such transformer is conventional in a system of the type in hand and will not require detail description except in connection with the description which follows of the novel components which we have introduced. Since portions of the components in the phases A, B and C are identical, the descriptions of these will be limited for the most part to only the operation of phase A shown in FIG. 1 and it will be understood that a similar operation obtains in the other phases B and C shown in FIGS. 2 and 3 respectively. For convenience in relating these portions of the circuit, reference numerals used in phase A will be used where applicable in phases B and C with *b* or *c* appended thereto respectively. Other portions of the circuit not identical in each of the three phases will be independently described hereinafter. The rectified current from each component transformer in the system is conducted therefrom by lines 1a, 1b and 1c to a connecting line 2, from which the current is conducted by an extension 2a to the battery or other equipment (not shown) for which the system is designed to supply current.

The power section of the system, in which are incorporrted the silicon controlled rectifiers (SCR's) of present interest, will be first described. Then will follow under appropriate sub-headings a description of the several features of the system whereby the following basic functions are achieved, viz., (1) comparison and amplification, (2) synchronization or phase modification, and (3) pulse generation; concluding with a general description of the operation of the system as a whole. The elements particularly concerned with the power section and such functions will be found on FIG. 1, those pertaining to such functions being located within dot-and-dash enclosures labeled with the corresponding sub-headings.

*Power section*

Rectification and regulation is obtained from the SCR's. In phase A, the reference phase, the angle at which SCR1 and SCR2 are turned on is varied by the control and firing circuit to keep the output voltage constant as the load and input magnitude vary. The inductor 3 provides filtering and reduces the peak current through the SCR's. Since the inductor 3 reduces the peak current, conduction must take place over a longer period than if the inductor were not present to obtain a given average value of current. The maximum rated average current obtainable from SCR's is a function of the conduction period, the rating increasing with increasing conduction angles. Thus, the inductor is needed to take full advantage of an SCR's rating and it contributes filtering also. The capacitor 4 is common to all phases and is used for filtering. Diodes 5 and 6 can be eliminated if desired. By using diodes in series with the SCR's the reverse rating of the SCR's may be reduced and this lowers the cost of the SCR's. At the present time the combined cost of high voltage diodes and low voltage SCR's is less than the cost of high voltage SCR's. Hence, the use of the diodes depends on economic factors rather than circuit principles.

Capacitor 7 and its equivalent in the other phases provides a path to ground for the SCR firing current. This capacitor is not required when pulse transformers are used to apply the firing signal to the SCR's. Note that the SCR's are connected to the input transformer in the common full wave rectifier arrangement. Transformer T4 and its equivalents in the other phases are used only to sense current. They are a part of the current balance control circuitry.

*Comparator and amplifier*

The first step of the control process is to compare the output voltage to a fixed reference voltage. In FIG. 1, where the purpose of the system is to regulate voltage, a fraction of the output voltage is compared to the voltage across the reference zener diode 10. The comparison is made in a differential amplifier composed of transistors 11 and 12 and their associated components. A voltage divider composed of resistors 13, 14, 15 and 16 provide a fraction of the output voltage to be compared to the reference voltage. Capacitor 17 and resistor 17a, along with the resistors of the voltage divider, filter the signal being fed back and shape the overall frequency response to insure stable operation. The differential amplifier comprises a bias resistor 18 and collector load resistor 19. The differential amplifier amplifies the difference between the reference and feedback signal as well as comparing them. The voltage to the reference zener diode 10 is regulated by resistor 21 and zener diode 22. A bias resistor 23 is also provided for zener diode 10. A voltage divider 24 and 25 supplies a bias voltage to other parts of the circuit. The need for this bias is discussed later.

The output of the differential amplifier is the control signal 80 (i.e., that signal on the line identified by the reference numeral 80). If the output voltage on line 2a becomes larger than the desired value, the control signal 80 increases and if the output voltage on line 2a decreases, the control signal 80 decreases. The firing angle of the SCR's is a function of the control signal 80 magnitude. The firing angle of the SCR's decreases as the control signal 80 increases. When the output voltage on line 2a decreases, the control signal 80 causes the firing angle of the SCR's to increase which causes the output voltage to increase.

Transistor 26 and its bias resistor 27 are a buffer amplifier for the control signal 80. It provides isolation and current amplification resulting in control signals 81 and 82.

The control signals 81, 82 are applied to the phase modulators for each phase. A single phase system would have only one phase modulator and transistor 26 then could be omitted.

*Phase modulator*

The phase modulator produces a timing pulse which varies in time as a function of the control signal magnitude. Transistors 28, 29 and 20 and their associated components constitute a regenerative circuit which switches all of the current in such third transistor 20 from the second transistor 29 to the first transistor 28, when the base voltage of the latter becomes equal to the base voltage (which is the control signal 82) of the second transistor 29. A pulse is produced at the collector of such first transistor 28, when the switching takes place. The input to the base of transistor 28 is a rectified sine wave developed from secondary winding P1, and added to part of the DC reference voltage from zener 10. The control signal 80 ranges from the reference voltage as a minimum to the collector supply voltage of transistor 12.

A greater control range (larger variation of SCR firing angles) is achieved by adding DC to the rectified sine wave. The DC voltage is made less than the reference voltage of zener 10, with resistors 24 and 25, so that the base of transistor 28 will go negative with respect to transistor 29 every half cycle when the control signal 82 is a minimum. The rectified sine wave is derived from the phase voltage for which the firing pulses are generated. This synchronizes the firing pulses with the power input waveform. The phase modulator can vary the firing pulses a maximum of 90°. The sine wave, which is rectified by diodes 30, 31, 32 and 33, is shifted in phase by the RC network 34, 35, 36 and 37, so that the 90° range of pulse variation will be centered at the most effective portion of the input waveform. A bypass capacitor 38 is provided to eliminate noise and a resistor 39 is a fixed load on the rectifier network.

A more detailed explanation of the phase modulators of the system follows with respect to the modulator of phase A. Transistors 28, 29 and 20 and associated components are connected in a modified one shot circuit arrangement. In any condition transistor 20 is biased for conduction through the voltage divider connected to its base lead. Collector current is supplied through either transistor 28 or 29 dependent upon the relative base biases of the transistors 28, 29. For the initial portion of a cycle transistor 29 is conducting since the control signal 82 provided from transistor 26 of the amplifier stage biases the base of transistor 29 more positive than the rectified full wave AC signal biases the base of transistor 28. It will be noted that the signal on the base of transistor 28 has been delayed by the phase shift circuit to bring the signal into an optimum relationship with the power wave from transformer T1 and is referenced to a DC level provided by voltage divider resistors 24, 25.

When the base of transistor 28 becomes more positive than the base of transistor 29, transistor 28 will start to conduct thereby bringing its collector voltage to a more negative value. This negative transient from the collector of transistor 28 is coupled to the base of transistor 29 by way of capacitor 78 thereby further reinforcing the switching action of the phase modulator circuit. A negative pulse is produced at the collector of transistor 28 and is coupled to the pulse amplifier stage. The phase modulator will return to its original conductive condition wherein transistor 29 is conducting when the biases on the respective bases have again changed their relationship and the coupling capacitor 78 has dissipated its charge thereby preparing the circuit for the next cycle.

Thus the operation of the phase modulator may be stated as follows: The generation of a pulse for triggering the SCR's will occur later in any cycle when the phase shift of the rectified AC signal applied to the base of transistor 28 is greater or the DC level of the control voltage 82 applied to the base of transistor 29 is higher than a reference condition. Later triggering will cause a smaller firing angle or a smaller conduction angle, thereby decreasing the average current flow of that phase. Conversely, when the phase shift is less or the control voltage is lower, triggering will occur earlier in the cycle causing a larger firing or conduction angle, thereby increasing the average current flow.

Pulse amplifier

Transistors 40, 41 and 42 and their associated components are used to amplify the pulse from the above described phase modulator. Resistors 43 and 44 limit the gate currents of the SCR's. However, our improved system is not limited to such specific pulse amplifier and the latter could take different forms, without affecting operation of the system.

The pulse from the phase modulator which is amplified in transistor 40 is directed to dual transistors 41 and 42 to produce a pair of pulses at outputs 60, 61, which are used to trigger the SCR's of that phase. Transistors 41, 42 are employed to isolate the outputs while providing sufficient amplification of the signal. The pulses at outputs 60, 61 are directed to the gate input terminals 62, 63 of SCR1 and SCR2 by lead connections not shown in the drawing in order not to unduly complicate the drawing.

Modified integrator circuit

Instead of a rectified sine wave, a modified integrator circuit can be used to obtain the voltage necessary to give a change in phase of the firing pulse as the control signal changes level, and such a circuit is shown in FIG. 4.

This circuit would take the place of parts 30 through 39 in FIG. 1, and lines A and B in FIG. 4 would be connected to lines A' and B' in FIG. 1. The bridge rectifier consisting of diodes 50, 51, 52 and 53 provides a full-wave rectified sine wave signal in phase with the voltage on the SCR's. When the bridge output voltage begins to rise from zero, diode 56 acts as an open circuit, and capacitor 57 charges slowly through resistor 55. This charging action continues until the half sine wave passes its peak value and begins to decrease. When the decreasing sine wave voltage reaches the value of the voltage across capacitor 57, diode 56 begins conducting and capacitor 57 discharges through resistor 54, its voltage following that of the half sine wave. Thus the voltage across the capacitor 57 is again at zero when the next half sine wave starts to rise. Using this circuit, a phase modulator is obtained which can vary the firing pulse a maximum of 150°, or more, depending on the relative values of the components in the circuit.

General operation

One of the limiting factors for multi-phase power systems is the unbalance between phases due to unbalanced input voltages or unbalanced phase components. The phases can carry unequal portions of the load due to unbalances and this results in increased output ripple and forces the phase power sections to be designed for a larger power capacity than would be satisfactory if the phases were balanced. Accordingly, one of the important aspects of our system is the circuitry whereby current balance control is achieved, or in other words the average phase currents are equalized. To this end, the phase currents are first sensed and converted to a DC voltage proportional to average phase currents for the phases being balanced. The differential amplifiers 70, 71 use the control signal as the collector input voltage for one transistor. If an unbalanced condition exists, the differential amplifier will conduct current through resistor 45, or its equivalent for other phases, and modify the control signal in a manner to make the average phase current equal to the average current of the reference phase A. It will be noted that the control signal to the reference phase A has been modified by resistors 46 and 47 so that the circuit will work for both positive and negative phase unbalances about the reference phase.

Current sensing transformer T4 consists of a single secondary winding and a pair of primary windings, one in series with SCR1 and the other with SCR2 to sense the current flowing through each of the SCR's. It will be noted that the primaries are connected in a manner such that when current is flowing in one of the primary windings it will induce a voltage in the other primary winding of a phase not tending to cause conduction through the other SCR. Additionally, the inductances of transformer T4 are small and their effect upon the circuit may be considered negligible. The secondary voltage is transformed through a full wave rectifier consisting of two diodes and a filter circuit generally shown at 64 to a DC level appearing on line 65. A similar current sensing arrangement is used in phases B and C to produce DC levels representative of the current flow through phases B and C on lines 65b and 65c respectively. The DC current level signals are combined in difference amplifiers 70 and 71 in phases B and C to produce a difference signal for control of the respective phase modulators.

Difference amplifier 70 will be described in somewhat greater detail and it will be recognized that a similar action occurs in difference amplifier 71. Difference amplifier 70 consists of transistors 72 and 73 connected together to a common bias amplifier consisting of transistor 74 and associated circuitry. The collector of transistor 72 is connected to a fixed voltage level through a collector resistor while the collector of transistor 73 is connected to output 81 of the control signal amplifier 26 through resistors 75 and 45.

In the balanced current condition of phases A and B it will be assumed that the DC levels on lines 65 and 65b will be equal, thereby applying equal voltages to the bases of transistors 72 and 73 of difference amplifier 70. In this condition control signal 81 will be applied to a voltage divider consisting of resistor 45, collector resistor 75 and the impedance of the difference amplifier circuit 70, with the voltage from the junction of resistors 45 and 75 directed to the control voltage input of the phase modulator for phase B. When the current in phase B becomes greater than that of phase A, the voltage on line 65b, applied to the base of transistor 72, will become more positive causing increased conduction in transistor 72 and a consequent increase of the voltage at the emitters of transistors 72, 73. This will tend to reverse bias the base-emitter junction of transistor 73 causing reduced current flow or an effective increase of the impedance of transistor 73. The result is to produce a greater portion of the control signal 81 at the junction of resistors 45 and 75, and at the input to the phase modulator, thereby delaying the generation of the triggering pulse or decreasing the conduction angle of the SCR's.

It should be clear that an opposite result is obtained if the current in phase B becomes less than the current in phase A or that no effect upon the control signal is produced by the circuitry if the currents are balanced in the respective phases.

Thus the output of the difference amplifier taken from a point between resistors 75 and 45 is a function of the control signal and the current difference between phases A and B. It is seen that the output from difference amplifier 71 in phase C is similarly a function of the control signal and the difference of current signal of phases A and C.

Finally, it will be noted that our system makes adequate provision for load compensation. The output varies a small amount due to input line variations and load variations. The variation is related to the amount the control signal must change to accommodate the output variation. If load and line changes are sensed and used to change the control signal, improved regulation can be obtained. A voltage proportional to load current is available from the phase current balance circuitry. This voltage is applied to transistor 48 and the control signal is modified to the extent that little change in the output occurs when the load changes. The value of resistor 49 will affect the amount of load compensation which is introduced.

Thus the load compensator acts as a variable impedance shunted across the control signal 80, the impedance being a function of the current in phase A determined by the DC level on line 65 applied to the base of transistor 48. As increased current is drawn by the load, a higher DC level appears on line 65, causing transistor 48 to increase conduction or to appear as a lower impedance shunting the control signal 80. The control signal 80 thus drops in voltage level and causes the production of an earlier triggering pulse from each of the phase modulators of the respective stages. Similarly, the opposite result is obtained when the conditions are reversed. That is, when current reduces in phase A the impedance of the load compensator will increase, thereby raising the level of the control signal 80, causing the production of a later triggering pulse.

It is noted that the effects upon the control signal 80 by the voltage comparator circuitry and the load compensator are in an aiding relationship. Thus, as current flow increases or voltage output drops, an earlier triggering pulse is produced or conversely, as current flow decreases or voltage output rises, a later triggering pulse is produced. The combined effect of the two control circuits is to provide improved regulation of the output voltage over a wider current range than has heretofore been possible including a faster response to transient conditions affecting the circuit.

It is also to be noted that although the load compensator monitors current flow in only phase A, due to the current balance circuitry previously described the regulatory effect is equally applicable in all phases of the circuit.

Single phase operation

The circuitry of the invention may be used in a single phase arrangement utilizing most of the characteristics shown for the previously described three phase circuit. For single phase control the circuitry is that shown in FIG. 1 and including the load compensator shown in FIG. 2. Only a single transformer T1 is used and of course no current balancing is required in this circuit.

The operation of the comparator and amplifier, phase modulator and pulse amplifier are identical to the operation described in the three phase circuit. Load compensation is also utilized in the single phase arrangement and since current for this control is sensed by transformer T4 in phase A the circuit is still effective. The amplifier consisting of transistor 26 would not be necessary in this arrangement, however a division of the signal as through resistors 46 and 47 would still be employed to obtain the proper operating level.

Specifically the circuit interconnections would be as follows for the single phase arrangement. The line leading from the junction of the collector of transistor 12 and resistor 19 would be connected to resistor 46 in series with resistor 47 to ground. The line leading from the junction of resistor 46 and resistor 47 would be connected through a voltage dropping resistor to the base of transistor 29. The collector of the load compensating transistor 48 would be connected to the line leading from the junction of the collector of transistor 12 and resistor 19 and the base of the transistor 48 would be connected to line 65. Line 2 could be eliminated from the circuit shown in FIG. 1.

Servo amplifier

In pointing out further the versatility of this circuit it is noted that the circuit may be utilized also as a servo amplifier wherein the output on line 2a is a function of an input signal rather than a fixed voltage level. In this embodiment, rather than applying a fixed reference voltage to the base of transistor 12 in the comparator circuitry, a variable voltage may be applied as the input signal. The output voltage at line 2a would conform to the input signal on an amplified scale and could be utilized to drive a motor or perform any other function under precise control. The output signal at line 2a would be "slaved" to the input signal thus applied, and the remainder of the circuitry including the triggering circuits, current balance and load compensation would perform in a manner similar to that described in detail in the preferred embodiment.

Other modes of applying the principle of the invention may be employed, change being made as regards the details described, provided the features stated in any of the following claims or the equivalent of such be employed.

We, therefore, particularly point out and distinctly claim as our invention:

1. Apparatus for converting a three phase source of power to regulated DC, comprising a three phase power source, controlled rectifier means connected in each phase of power for providing current flow for intervals of each cycle in each phase, a load connection common to all three phases, and circuit control means for initiating conduction of said controlled rectifier means during each cycle, said circuit control means including means for comparing the voltage at said load connection with a reference voltage and for producing signals which vary in proportion to the difference between said compared voltages, means in each phase responsive to said signals for providing triggering signals for initiating conduction of said controlled rectifier means in the respective phase, means in one phase for sensing current flow through said controlled rectifier means of that phase and for producing an output proportional thereto, and means in each of the other phases for comparing current flow in each respective phase with the current flow in said one phase and operative to modify the operation of the respective said triggering signal providing means to vary the time of initiation of conduction of the respective said controlled rectifier means to maintain the voltage constant at said load connection.

2. Apparatus for converting a three phase source of power to regulated DC, comprising a three phase power transformer, controlled rectifier means in each phase of power for providing current flow for intervals of each cycle in each phase, a load connection common to all phases, circuit control means for initiating conduction of said controlled rectifier means during each cycle, said control means including means for comparing the voltage at said load connection with a reference voltage and for producing signals which vary in proportion to the difference between said compared voltages, means in each phase responsive to said signals for providing triggering signals for initiating conduction of said controlled rectifier means in the respective phase, means in each phase for sensing current flow through said controlled rectifier means of that phase and for producing an output proportional thereto, means in two of the phases for comparing said outputs of the phases with said output of the third phase and operative to modify said trigger signal means of the respective two phases to vary the time of initiation of conduction of the respective said controlled rectifier means, and means responsive to said output of the third stage to modify said signals to further vary the initiation of conduction of said controlled rectifier means to maintain a constant voltage at said load connection.

3. Apparatus as set forth in claim 2, wherein said controlled rectifier means comprises a pair of silicon controlled rectifiers connected in full wave arrangement.

4. Apparatus as set forth in claim 2, further including an inductance in each phase connected between said controlled rectifier means and the common load connection.

References Cited

UNITED STATES PATENTS

| | | | |
|---|---|---|---|
| 3,114,873 | 6/1963 | Love | 307—88.5 |
| 3,139,575 | 6/1964 | Brown | 307—88.5 |
| 3,152,296 | 10/1964 | Meszaros. | |
| 3,165,649 | 1/1965 | Ault. | |
| 3,183,376 | 5/1965 | Boyer et al. | 321—46 |
| 3,185,912 | 5/1965 | Smith. | |
| 3,202,871 | 8/1965 | Shelar | 307—88.5 |
| 3,218,540 | 11/1965 | Jackson | 321—18 |

OTHER REFERENCES

G.E. Silicon Controlled Rectifier Manual, 2nd edition, 1961 (pp. 120–122 relied on).

JOHN F. COUCH, *Primary Examiner.*

M. L. WACHTELL, *Assistant Examiner.*